Oct. 30, 1962     R. K. BRODERSEN     3,061,805
SIGNAL GENERATOR

Filed March 7, 1961     2 Sheets-Sheet 1

ROLF K. BRODERSEN
INVENTOR.

BY
ATTORNEYS

Oct. 30, 1962  R. K. BRODERSEN  3,061,805
SIGNAL GENERATOR

Filed March 7, 1961  2 Sheets-Sheet 2

ROLF K. BRODERSEN
INVENTOR.

BY
ATTORNEYS

United States Patent Office 3,061,805
Patented Oct. 30, 1962

3,061,805
SIGNAL GENERATOR
Rolf K. Brodersen, Orange, N.J., assignor to General Precision Inc., Little Falls, N.J., a corporation of Delaware
Filed Mar. 7, 1961, Ser. No. 94,050
3 Claims. (Cl. 336—135)

The present invention relates to signal generators for a gyroscope, and more particularly to such signal generators in which rotor segments transmit and distribute flux over stationary output coils, the excitation flux being transmitted to the rotor by an airgap, and the excitation coils being tuned to provide suspension of the rotor.

In signal generators which are used to determine the angular position of a gyroscope, the variance of the permeance of an air gap with angular displacement, generally causes reaction torques which have to be carefully compensated for by precision fabrication techniques. Other pickoffs, which avoid such permeance variation with angular position, such as moving coil type signal generators, require pigtails, and thereby introduce undesirable pigtail restraint torques and reduce the reliability of the instrument.

It is a general object of the present invention to provide a signal generator for gyroscopes which will obviate the above noted disadvantages.

Another object of the present invention is the provision of a signal generator which is free of reaction torque.

A further object of the present invention is to provide a signal generator in which airgap permeance is constant during angular displacement.

A still further object of the present invention is the provision of a signal generator which does not require the use of pigtails.

Yet another object of the present invention is to provide a signal generator having a rotor free of radial forces over a range of radial or off-center displacements.

Another object of the present invention is the provision of a signal generator in which the effect of radial displacement on signal output is nullified.

Other objects and the nature and advantages of the present invention will be apparent from the following description taken in conjunction with the accompanying drawings, wherein.

Figure 1:
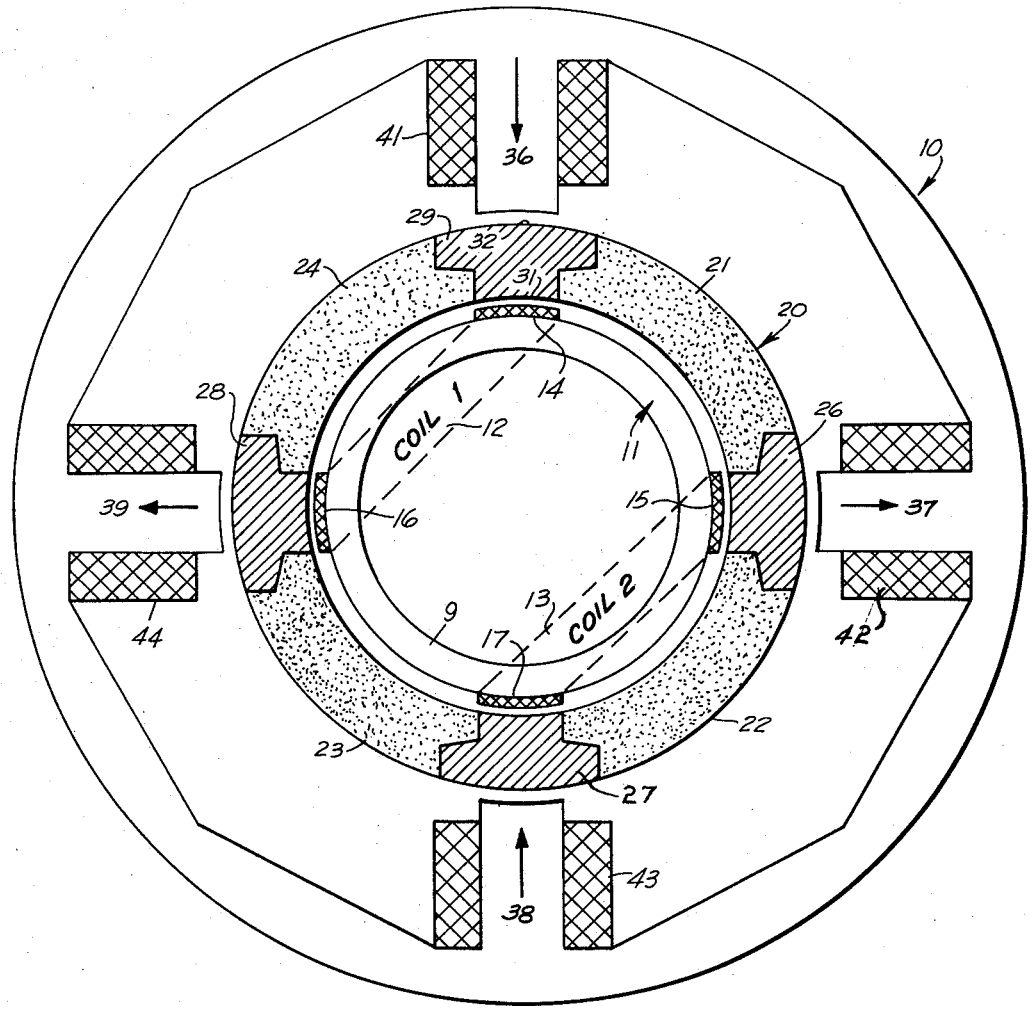
FIG. 1 is an illustrative view, partially diagrammatic, of a signal generator in accordance with the present invention.

Referring now to the drawings, wherein like or corresponding reference numerals are used to designate like or corresponding parts, there is shown in FIG. 1, a signal generator 10 having an inner annular stator 11, including an inner tubular ring 9, preferably made of ferrite. The inner ring of the stator 11 has thereon the chordal wound output coil 12 and a similar chordal wound output coil 13. The coils 12 and 13 each have a pair of winding coil sections 14 and 16, and 15 and 17, respectively. The coil sections 14, 16, 15 and 17 extend parallel to the axis of stator 11, and are equally spaced thereabout.

A rotor 20 is provided outwardly of stator 11, and comprises four segments 21, 22, 23 and 24 which are preferably of ceramic material. Equally spaced between the ceramic segments are the four segments 26, 27, 28 and 29 which are of ferrite. The segments 21, 22, 23, 24, may be made of any non-magnetic material. The segments 26, 27, 28, 29 may be made of any ferro-magnetic material. The ferrite segments are each characterized by having an inner face 31 which is of approximately the same circumferential extent as a winding section and an outer face 32 of relatively greater circumferential extent, so that the ferrite segments may be seen to have relatively large heads.

The rotor 20 is surrounded by a stator 10 which has the four poles 36, 37, 38 and 39, in equally spaced relationship. The face of a pole is of substantially less circumferential extent than the face 32 of a corresponding ferrite segment. On the poles there are provided bobbin wound coils 41, 42, 43 and 44. These coils function as excitation coils.

Rotor 20 will be magnetically suspended due to the excitation coils 41, 42, 43, 44, or by proper tuning of these coils, rotor 20 will be free of radial forces over a range of radial or off-center displacement. The rotor segments 26, 27, 28 and 29 will transmit and distribute flux over the stationary output coils 12 and 13, the flux being transmitted to the rotor 20 by the airgap between the poles 36, 37, 38 and 39 and the segments 26, 27, 28 and 29, respectively.

The inductive pick-off may be obtained without reaction torque, and as will be understood there will be no change in permeance of the airgap with angular displacement. Further, the excitation coils 41, 42, 43 and 44 will provide an alternating flux of sufficient strength to generate an adequate signal output.

Figure 2:
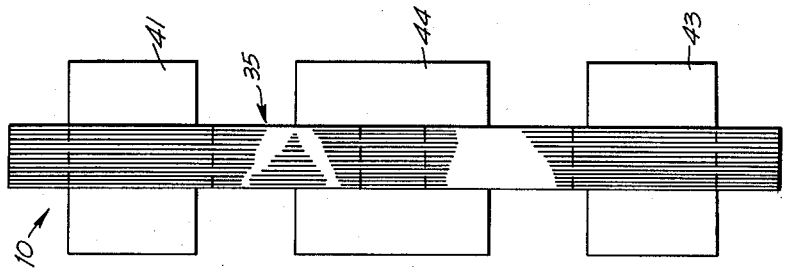
FIG. 2 is a side view of the signal generator of FIGURE 1.

The stator 10 is of laminated construction, as may be seen in FIGURE 2.

Figure 3:
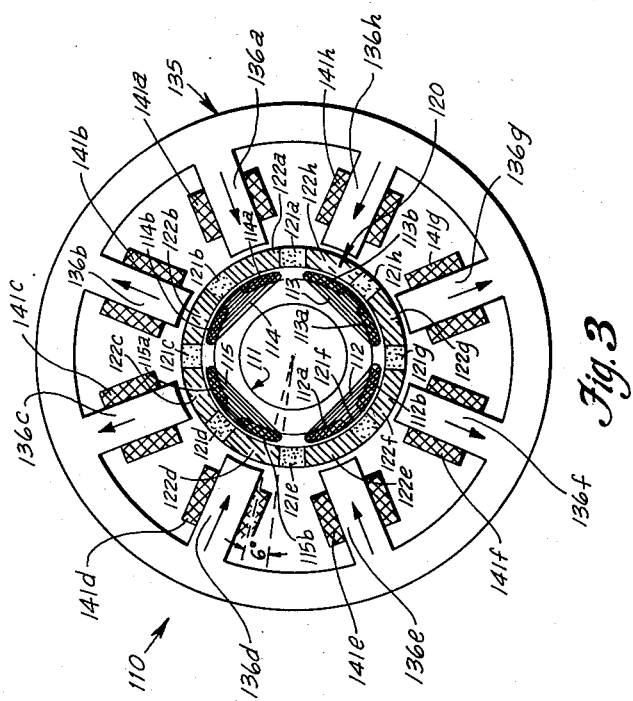
FIG. 3 is a similar view of another signal generator in accordance with the present invention.

In the embodiment of the invention shown in FIGURE 3, the signal generator 110 has an annular stator 111 having thereon chordal wound output coils 112, 113, 114 and 115, each having a winding part designated 112a, 112b, 113a, 113b, etc., which are like in placement to the winding coil sections of the coils 12 and 13. There are, as may be seen, eight winding parts of the generator 110.

The rotor 120 is made up of eight alternate segments 121a, 121b, etc., of ceramic material between which are eight segments 122a, 122b, etc. of ferrite or the like. Each of the segments abuts its adjacent segment at a boundary which lies along a radius extending outwardly from the center of the generator 100. The segments 121a, 121b, etc. may be made of any non-magnetic material. The segments 122a, 122b etc. may be made of any ferromagnetic material.

The stator 135 has eight radially inwardly extending poles 136a, 136b, etc., with coils 141a, 141b, etc. thereon, respectively. The coils 141a, 141b, etc. are constructed and function in substantially the same way as the coils 41, 42, etc. of the signal generator 10. Similarly to the construction of signal generator 10, also, the face of each of the poles is of less circumferential extent than the face of a corresponding ferrite segment. More particularly, and as will be understood from FIGURE 3, the outer face of a ferrite segment 122a, 122b, etc., will subtend in arc which is greater than the arc subtended by the face of a corresponding pole 136a, 136b, etc.

The signal generator 100 is similar in operation to the signal generator 10, and offers substantially the same advantages, being, however, more sensitive because of the greater number of poles and segments.

It will be obvious to those skilled in the art that various changes may be made without departing from the spirit of the invention and therefore the invention is not limited to what is shown in the drawings and described in the specification but only as indicated in the appended claims.

What is claimed is:
1. A signal generator for a gyroscope used to determine the angular position of the gyroscope comprising;
an inner annular stator including a tubular inner ring;

first and second chordal wound output coils on said stator, pairs of sections of each of said coils located adjacent the outer circumference of the inner ring being parallel to the longitudinal axis of the inner ring, said coil sections being radially equally spaced relative to one another;

a rotor outwardly of said stator and comprising a plurality of pairs of segments of non-magnetic material and pairs of alternate segments of ferro-magnetic material, corresponding to the number of non-magnetic segments, said segments of ferro-magnetic material being respectively in equally spaced relation and having their outer faces of substantially larger circumferential extent than their inner faces; and an outer stator in surrounding relationship to said rotor, said stator having a plurality of pairs of equally spaced inwardly extending poles the number of pairs of poles, corresponding to the number of pairs of segments of ferro-magnetic material and an excitation coil on each said pole, the circumferential extent of said poles being substantially less than the outer faces of said segments of ferro-magnetic material.

2. A device as claimed in claim 1 there being two pairs of poles on said outer stator and two pairs of segments of ferro-magnetic material.

3. A device as claimed in claim 1 there being four pairs of poles on said outer stator and four pairs of segments of ferro-magnetic material.

References Cited in the file of this patent
UNITED STATES PATENTS

| | | |
|---|---|---|
| 1,227,185 | Neuland | May 22, 1917 |
| 2,842,749 | Bonnell | July 8, 1958 |
| 2,856,238 | Dacus | Oct. 14, 1958 |